United States Patent
Sapija et al.

(10) Patent No.: US 11,499,652 B2
(45) Date of Patent: Nov. 15, 2022

(54) MOTORISED VALVE WITH VERTICAL SHAFT AND SUPER CAPACITOR BACKUP POWER

(71) Applicant: Hamilton Sundstrand Corporation, Charlotte, NC (US)

(72) Inventors: Dariusz Sapija, Dolnoslaskie (PL); Agata Kurowska, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/212,116

(22) Filed: Mar. 25, 2021

(65) Prior Publication Data

US 2021/0310581 A1   Oct. 7, 2021

(30) Foreign Application Priority Data

Apr. 3, 2020  (PL) ......................................... 433448

(51) Int. Cl.
  *F16K 37/00*   (2006.01)
  *F16K 31/06*   (2006.01)
  *F16K 11/065*  (2006.01)

(52) U.S. Cl.
  CPC ........ *F16K 37/0058* (2013.01); *F16K 11/065* (2013.01); *F16K 31/0675* (2013.01); *F16K 37/0041* (2013.01)

(58) Field of Classification Search
  CPC ............. F16K 37/0058; F16K 37/0041; F16K 11/065; F16K 31/0675
  See application file for complete search history.

(56) References Cited

U.S. PATENT DOCUMENTS

| 4,099,704 | A | 7/1978 | Okumura et al. |
| 8,424,838 | B2 | 4/2013 | Dolenti et al. |
| 8,978,692 | B2 | 3/2015 | Heron et al. |
| 9,518,675 | B2 * | 12/2016 | Cook .................. F16K 37/0008 |
| 10,125,892 | B2 | 11/2018 | Bentz |
| 2004/0216888 | A1 * | 11/2004 | Schmidt .............. F16K 37/0041 |
| | | | 166/242.6 |

(Continued)

FOREIGN PATENT DOCUMENTS

| EP | 3115666 A1 | 1/2017 |
| EP | 3538800 A1 | 9/2019 |
| WO | 2018086954 A1 | 5/2018 |

OTHER PUBLICATIONS

European Search Report for Application No. 21154628.8, dated Aug. 2, 2021, 7 pages.

*Primary Examiner* — Patrick C Williams
(74) *Attorney, Agent, or Firm* — Cantor Colburn LLP

(57) ABSTRACT

A valve assembly is provided, the valve assembly includes a shaft, the shaft comprising a sight through-hole; and a flow through-hole. The valve assembly further comprises a shaft position mechanism, the shaft position mechanism comprising a driving means configured to provide movement to the shaft, and at least one diode and at least one corresponding sensor. The valve assembly further includes at least one flow path from at least one fluid inlet to at least one fluid outlet, wherein the shaft is configured to move across the at least one flow path so as to allow flow therethrough in a first position, and to block the at least one flow path in a second position.

10 Claims, 6 Drawing Sheets

(56) References Cited

U.S. PATENT DOCUMENTS

| | | | |
|---|---|---|---|
| 2008/0164437 A1* | 7/2008 | Lam .................... | F16K 31/508 |
| | | | 251/326 |
| 2011/0105991 A1 | 5/2011 | Roth et al. | |
| 2013/0255786 A1 | 10/2013 | Nakai et al. | |
| 2020/0124187 A1* | 4/2020 | Hiraoka ................ | F16K 5/0485 |
| 2021/0116322 A1* | 4/2021 | Klanderud .......... | F16K 37/0041 |
| 2021/0131586 A1* | 5/2021 | Larsen ................ | F16K 37/0041 |

* cited by examiner

US 11,499,652 B2

MOTORISED VALVE WITH VERTICAL SHAFT AND SUPER CAPACITOR BACKUP POWER

FOREIGN PRIORITY

This application claims priority to Polish Application No. P.433448 filed Apr. 3, 2020, the entire contents of which is incorporated herein by reference.

BACKGROUND OF THE INVENTION

Motorised valves can indicate position of a valve shaft via the use of microswitches. These can give information about a position of a valve shaft even if the valve is not being sourced with power, as they provide a physical position input. However, other sensors cannot provide such functionality, and rather require constant power to feedback the position of the valve. Therefore, if it is necessary that the position of the valve is still to be measured in the event of a power failure, it is not possible to use other sensors such as optical sensors.

For example, such motorised valves may be provided within aircraft.

SUMMARY OF THE INVENTION

In a first aspect, there is provided a valve assembly comprising a shaft, the shaft comprising a sight through-hole and a flow through-hole. The valve assembly further comprises a shaft position mechanism which comprises a driving means configured to provide movement to the shaft and at least one emitter with at least one corresponding sensor. The valve assembly further comprises at least one flow path from at least one fluid inlet to at least one fluid outlet. The shaft is configured to move across the at least one flow path so as to allow flow therethrough in a first position, and to block the at least one flow path in a second position. The at least one emitter and the at least one corresponding sensor are positioned such that, when the shaft is in the first position, the sensor can sense the emitter through the sight through-hole of the shaft, and when the shaft is in the second position, the sensor is blocked from the emitter by the shaft.

Additionally, the at least one emitter may comprise a first and a second emitter, and the at least one corresponding sensor may comprise corresponding first and second sensors, and the at least one fluid outlet may comprise a first and a second fluid outlet. The shaft may be further configured to move to a third position so as to allow flow from the at least one inlet to the first outlet, and block flow from the at least one inlet to the second outlet. The first and second emitter and the corresponding first and second sensors may be positioned such that, when the shaft is in the first position, the first sensor can sense the first emitter through the sight through-hole of the shaft, and the second sensor is blocked from the second emitter by the shaft; and when the shaft is in the second position, the first and second sensors are blocked from the first and second emitter by the shaft, and when the shaft is in the third position, the second sensor can sense the second emitter through the sight through-hole of the shaft, and the first sensor is blocked from the first emitter by the shaft.

The fluid inlets and outlets may be located within a bracket, and wherein the valve assembly is provided with a cylindrical cover with a threaded connection to connect to the bracket. The assembly may further comprise o-rings to seal the valve assembly.

The at least one emitter may be diodes.

The valve assembly may further comprise power and signal wires for connection to an external system. The valve assembly may further comprise a direct current, DC, motor to operate the driving means.

The shaft of the valve assembly may further comprise grooves in the shaft that interact with the driving means to provide movement of the shaft.

The valve assembly may further comprise, a supercapacitor, the supercapacitor being configured to power at least the at least one emitter and the at least one sensor.

In a second aspect, there is provided a system comprising the valve assembly as described above, a control module; and a power source, wherein the power source is configured to power the valve assembly and charge the supercapacitor, the supercapacitor being configured to power the at least one emitter and the at least one sensor in case of failure of the power source. For example, the system may be provided for use in an aircraft.

In the event of a power failure of the power source, the shaft may be configured to move to the second position, thereby closing the valve.

BRIEF DESCRIPTION OF THE DRAWINGS

Preferred examples will now be described by way of example only and with reference to the drawings.

DETAILED DESCRIPTION OF THE INVENTION

Microswitch sensors typically used as position sensors in motorised valves suffer from several issues. Firstly, the microswitches themselves can suffer from mechanical wear down after repeated use. For example, the metal lever that is used as a contact in a microswitch can bend, which can render the microswitch ineffective. Microswitches additionally need to be customised so as to interact as desired with the rotary cam to push the microswitch lever according to its position. Additionally, microswitches have a wide tolerance on their operating level, which can lead to imprecise measurements of position.

In contrast, optical sensors have several benefits when compared to known microswitch sensors. Namely, such optical sensors do not suffer from mechanical wear down, as there need not be any physical contact between the sensors and the item which position is measured. Additionally, such sensors have no loose elements, which means that they are highly tolerant to vibrations. Generic optical sensors may be used as they do not need to directly interact with the valve to measure the position. Additionally, they operate with higher precision. The optical sensor precision can be achieved by providing a high density of light through only small diameters of holes.

Figure 1:
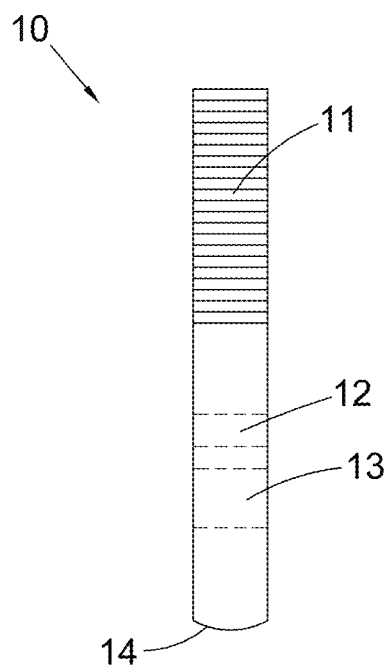
FIG. 1 shows a shaft for a motorised valve.

A vertical shaft 10 for use in a motorised valve is shown in FIG. 1. The shaft extends from a first longitudinal end 14, along a central longitudinal axis, to a second, opposite longitudinal end 15. The shaft comprises means 11 configured to provide movement of the shaft, which in this example are grooves 11. Other means may alternatively/also be used. The grooves may be formed via different methods. In this example the grooves are formed by milling. The shaft may be configured to move axially in the direction of the second end 15. In FIG. 1, the movement of the shaft 10 is in the vertical axial direction as shown in FIG. 1. The shaft 10 further comprises a sight through-hole 12, provided on its outer surface that, in use, is positioned so as to align with one or more sensors 22, 24 for example as described later, such that the one or more sensors 22, 24 can provide a signal therethrough. As also described later, this alignment with the sight through-hole 22 may indicate the position of the vertical shaft. The shaft 10 also comprises a fluid flow through-hole 13, such that, a fluid path may be provided through the shaft 10, before the end of the shaft 14.

Figure 2:
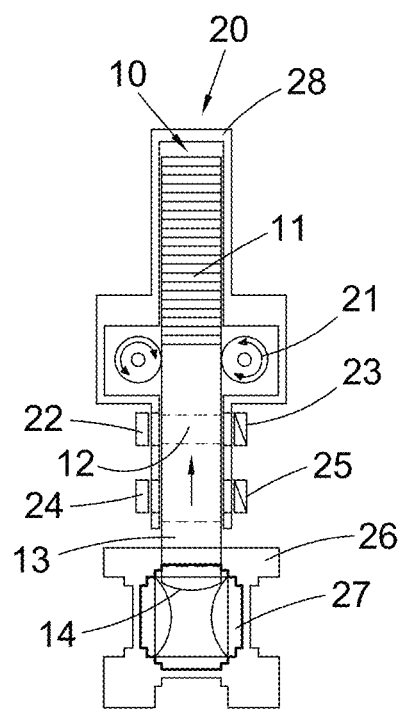
FIG. 2 shows a shaft position indication mechanism incorporating the shaft of FIG. 1.

In use, the shaft 10 may form part of shaft position mechanism 20 within a valve. The shaft position mechanism 20 is shown in FIG. 2. The means for providing movement 11 is/are provided so as work in combination with a corresponding driving means 21 to provide movement of the shaft 10. In the example of FIG. 2, the driving means 20 comprise a set of gears 21, which are configured to mesh with the milled grooves 11 of shaft 10. In this way, rotation of the gears 21 provides a corresponding axial movement of the shaft 10.

The shaft position mechanism 20 may further comprise at least two position sensors comprising emitters and corresponding receivers. For example, as can be seen in FIG. 2, the mechanism 20 comprises two infrared diodes 23, 25, each being disposed opposite a respective sensor 22, 24. In this way, when a direct line of sight is provided between the emitter 23, 25 and their respective sensor 22, 24, the sensor 22, 24 can provide an "on" signal, and where there is no line of sight, the sensor 22, 24 can provide an "off" signal. As would be appreciated by the skilled person, any number of different sensors could be utilised in this manner. For example, either laser diodes or ultrasonic sensors could also be used, as could any other emitter/receiver pair that provides the same function when a direct line of sight is provided between them.

For further connection to ports, the shaft position mechanism 20 may be further provided with a bracket 26 for the attachment of inlets and outlets, as well as sealings 27 between the shaft 10 and the bracket 26, and between any additional ports. The shaft position mechanism 20 may further be provided within a housing 28 so as to separate the shaft mechanism from any additional electronics.

Figure 3:
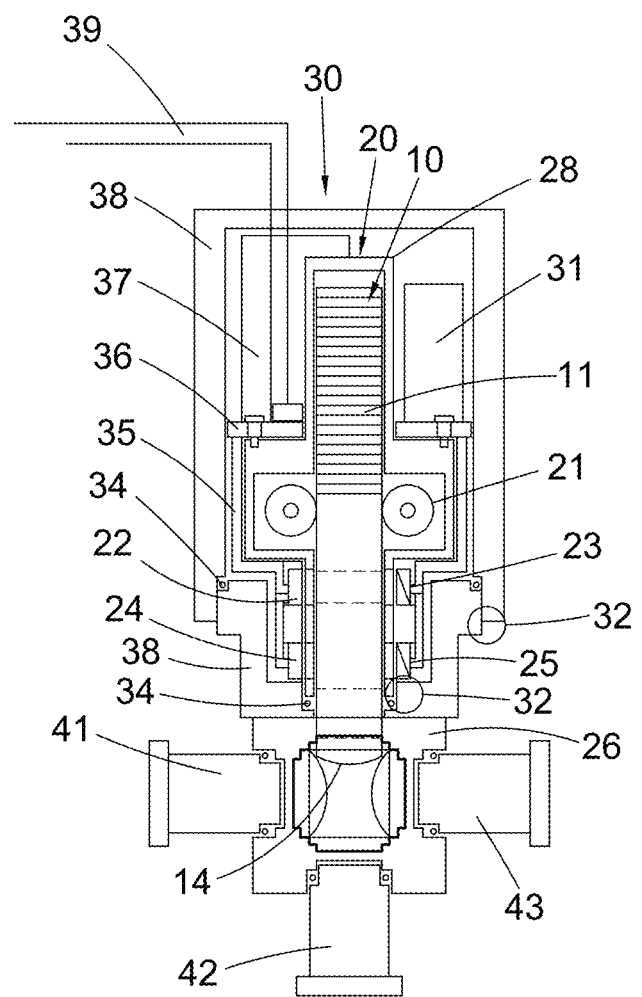
FIG. 3 shows a valve incorporating the shaft position indication mechanism of FIG. 2.

A valve 30 incorporating the shaft position mechanism 20 is shown in FIG. 3. The valve 30 has an inlet port 41 and outlet ports 42, 43 and may control flow between inlet port 41, and outlet ports 42 and 43. The housing 28 of the shaft position mechanism separates the shaft mechanism from the other electronics of the valve 30.

In normal use, the valve 30 may be powered by a power source connected to wires 39. For example, when the valve 30 is provided in an aircraft, wires 39 may be connected to the internal power network of the airplane to operate the valve 30. The wires 39 may comprise both power, and signal wires.

The valve may further comprise a motor 35 to operate the driving means 21, which in turn cooperates with the means for providing movement 11 of the shaft 10 to provide vertical movement of the shaft 10 as discussed above. For example, the motor 35 may be a DC motor configured to drive the gears 21 that interact with the milled grooves 11 to move the shaft 10 vertically past the bracket 26, and towards the flowpath from inlet 41 to outlets 42, 43. In this way, a change in flow between inlet 41 and outlets 42, 43 is provided.

The valve 30 may further comprise a supercapacitor 31. Supercapacitor 31 may be charged by the power system that otherwise operates the valve 30 after starting the power system, and may have enough capacity to operate the shaft position mechanism 20, at least such that the position of the valve can be sensed even after power supply is lost. For example, when the valve 30 is used in an airplane, the supercapacitor 31 may be charged by the internal power network of the airplane after starting the airplane power. If the power supply fails, then the power provided by the supercapacitor 31 enables the shaft indication mechanism 20 to still operate, thereby still providing an indication of the position of the shaft 10 within the valve 30, and therefore the operating status of the valve 30. Supercapacitor 31 may provide enough power to operate the shaft position mechanism for at least 2 hours, after power has been lost.

Supercapacitor 31 may be provided so as to be integrally formed with the electronic module 36, which further connects to the diodes 23, 25 and the sensors 22, 24 via the internal signal wires 35. The electronics module 36 may further be connected to a power source by wires 39. The wires 39 may comprise signal wires that allow the valve 30 to be controlled, as well as power wires to power the valve 30. In this way, the electronics module 36 can charge supercapacitor 31 when the valve 30 is connected to a functioning power source via wires 39, and power the diodes 23, 25 and corresponding sensors 22, 24 by the power source when it is functioning. When the power source fails, then the electronics module 36 may power the diodes 23, 25 and corresponding sensors 22, 24 via the charge stored in the supercapacitor 31, thereby maintaining the function of the position sensor even during power outages.

Additionally, the valve 30 may be provided with a cylindrical cover(s) so as to provide quick, easy and reversible connections. For example, the valve 30 may be provided with a cylindrical cover 38 that is assembled together with threaded connections 32 so as to functionally connect the valve 30 to the shaft position mechanism 20 and its bracket 26. Further, these connections may be sealed with O-rings 34, thereby preventing fluid from passing into the valve 30. In this way, only external power needs to be connected to wires 39, through the cylindrical cover 38.

The use of a longitudinal shaft, as opposed to a known rotary ball shaft, simplifies the use of an optical sensor for determining the position of the shaft 10.

The use of the valve 30 can be seen in FIGS. 4A to 4C and will now be described.

Figure 4A:
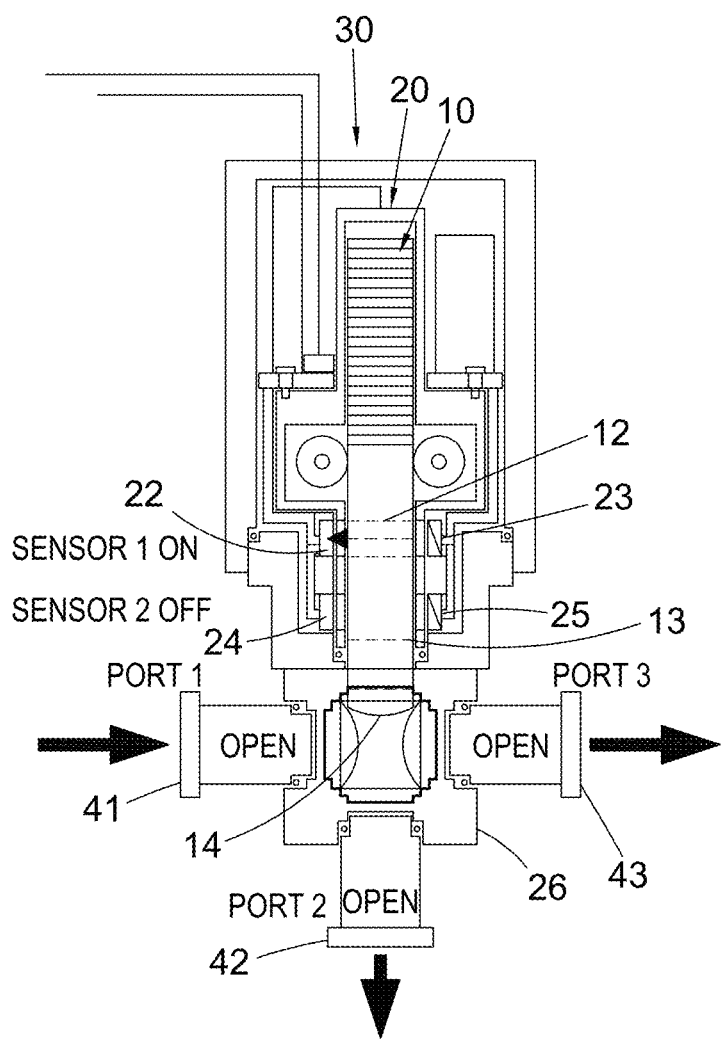
FIG. 4A shows a valve with the shaft in the high position.

FIG. 4A shows the valve 30 with the shaft 10 in a first, or high position. As can be seen, when the shaft 10 is in this first position, i.e. the high position in this figure, the shaft 10 does not lie within the flow path defined by inlet 41, and outlets 42, 43. In this position, a first sensor 22 is activated by light from diode 23 passing through the sight through-hole 12 of the shaft 10. Sensor 22 therefore provides an "on" signal. However, in this position, a second sensor 24 is deactivated, because the shaft 10 separates and blocks light from travelling between the diode 25 and second sensor 24. This is because no direct line of sight is provided between the diode and sensor in this position. Sensor 24 therefore provides an "off" signal.

In this high position, the first end 14 of shaft 10 is provided so as to be positioned above the bracket 26. Therefore fluid may freely flow between the inlet 41 and outlets 43, 42.

Figure 4B:
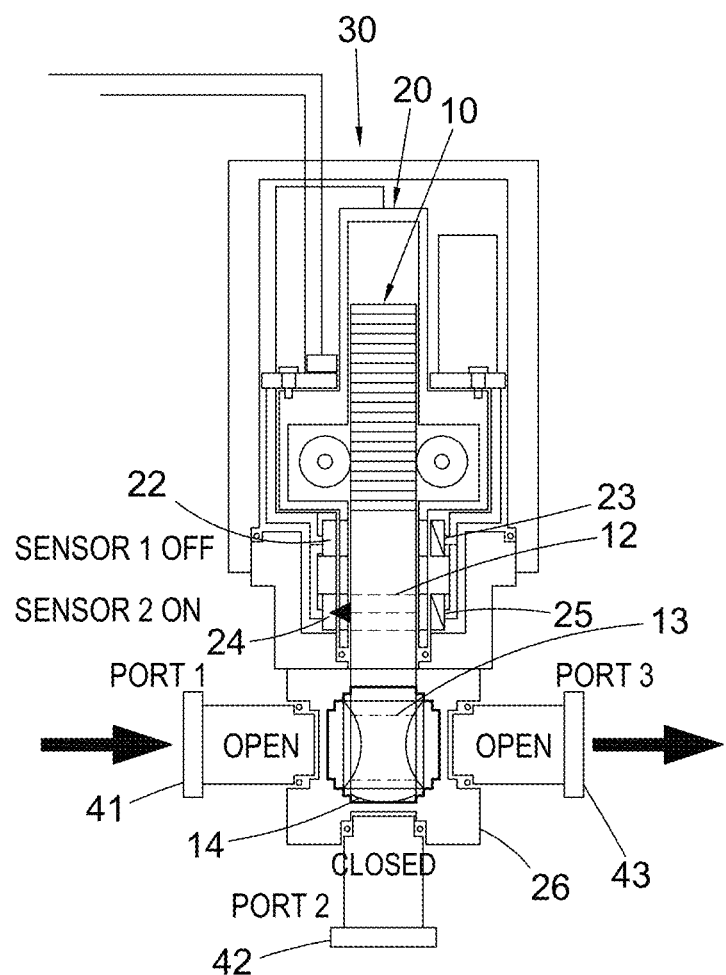
FIG. 4B shows a valve with the shaft in the middle position.

FIG. 4B shows the valve 30 with the shaft 10 in a second, i.e. middle position. As can be seen, when shaft 10 is in this middle position, the shaft 10 is positioned so as to lie within the bracket 26 such that a flow path is defined by inlet 41, through flow through-hole 13 in the shaft 10, and through the outlet 43. Flow to the outlet 42 is blocked by the first end 14 of the shaft 10. In this position, the first sensor 22 is deactivated, because the shaft 10 separates the first diode 23 from the first sensor 22, and therefore no direct line of sight is provided between the first diode 23 and the first sensor 22. Sensor 22 therefore provides an "off" signal as not light is able to pass through the sight through-hole 12. However, in this position, the second sensor 24 is activated by light from second diode 25 passing through the sight through-hole 12. The second sensor 24 therefore provides an "on" signal in this second position.

In this middle position, fluid may freely flow between inlet 41 and outlets 43, but fluid flow cannot pass to and through the outlet, since the first end 14 of the shaft 10 blocks flow to outlet 42.

Figure 4C:
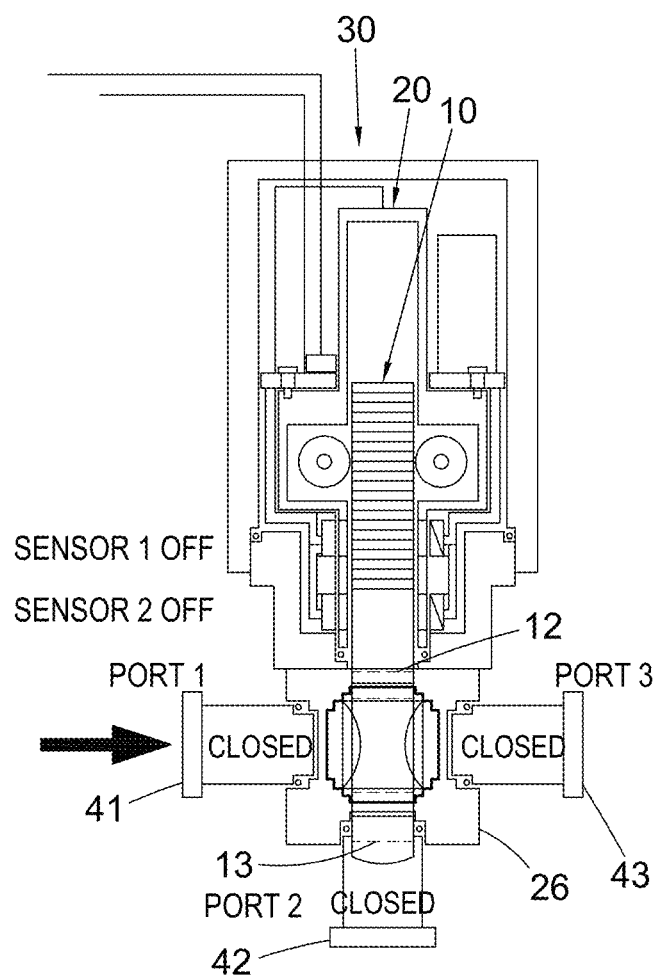
FIG. 4C shows a valve with the shaft in the low position.

FIG. 4C shows the valve with the shaft in a third, i.e. low position. As can be seen, when the shaft 10 is in the low position, the shaft 10 is positioned so that it lies completely within the bracket 26 such that all fluid flow is blocked by shaft 10. In this position, sight through-hole 12 lies above the bracket 26, and flow through-hole 13 lies below the bracket 26. In this position, both sensors 22, 24 are deactivated, because the shaft 10 separates diodes 23, 25 from sensors 22, 24, and therefore no direct line of sight is provided between either diode and its respective sensor. first sensor 22 therefore provides an "off" signal, and similarly second sensor 24 also provides an "off" signal.

In this low position, fluid is blocked by the shaft 10, and cannot flow from inlet 41 to either outlet 42 or outlet 43.

As can be seen above, for each of the high, middle and low positions, a unique combination of outputs from sensors 22, 24 is provided. In this way, by comparing the output of the sensors, it is possible to detect the vertical position of shaft 10, and thereby, through which outlets 42, 43 flow is being provided. As would be appreciated by the skilled person, the valve 30 may comprise any number of inlets, outlets, and the shaft may comprise a corresponding number of flow through-holes. Additionally the shaft may be provided with more diode/sensor pairs, and/or a corresponding number of sight through-holes. In this way, it is envisaged that the valve may be a comparatively more complicated valve with more ports, and multilevel shafts.

Figure 5:
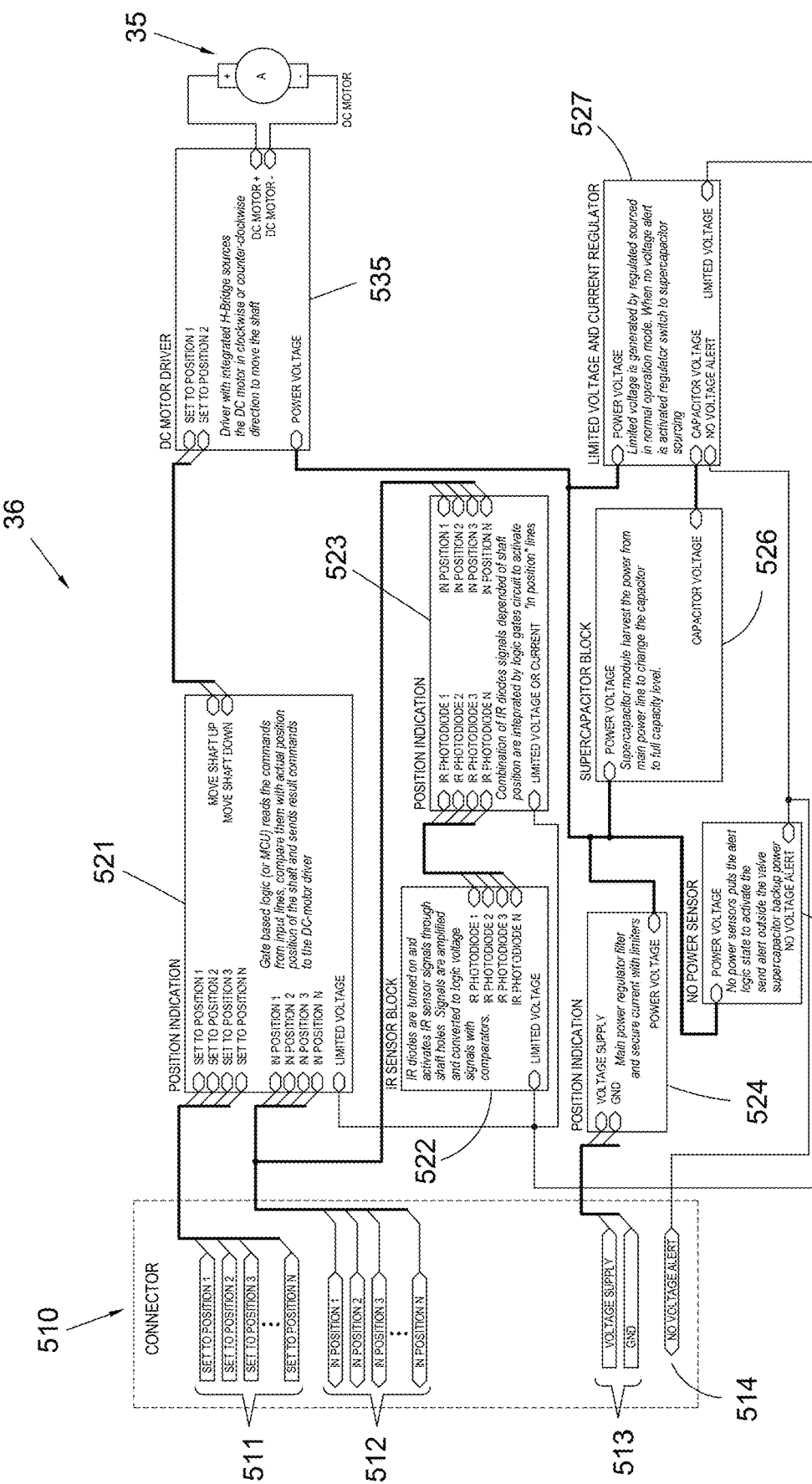
FIG. 5 shows a schematic block diagram of the control module of a motorised valve.

A schematic block diagram of the control module 36 of the motorised valve is shown in FIG. 5. The control module 36 may be located as seen in FIG. 3. The control module 36 may be located within the valve 30 connected to a connector 510, via wires 39 seen in FIG. 3 and ended with connector 510. Connector 510 may comprise signal line pins 511, 512, and voltage pins 513. A voltage supply and ground are supplied through pins 513 to a main voltage regulator 524, which distributes valve power voltage to DC motor 35 via DC motor driver 535. For the low voltage blocks, limited voltage and current regulator 527 supplies voltage to the low voltage blocks of the control module 500.

Supercapacitor block 526 harvests the power from the main power line 513 via main voltage regulator 524 after the start of the power on system, to charge the supercapacitor 31 to store backup power.

The position of the shaft 10 is detected by post processing the signals from the sensors in sensor block 522 and position indication block 523.

The logic block 521 (or microcontroller unit (MCU)) interprets the command signals 511, 512 from the connector 510 and compares them to the actual position of the shaft, and if a change is required, logic block 521 sends a signal to the DC motor driver 521 with an integrated H-Bridge which directly rotates the motor.

During normal operation, the no power sensor 525 controls the supply of power from the limited voltage and current regulator 527. However, in the case of no power, the supercapacitor block 526 is used to supply the logic block/ MCU, IR sensor block 522 and the position indication block 523. The supercapacitor 31 may provide enough power to continue to provide a shaft position indication for many hours.

In the no power mode, an alert signal 514 is put on connector 510, and the position of the shaft is still detected, and the higher operating system is still informed about status of the valve, without the need to use a microswitch position sensor. In order to provide detection of shaft position for a longer period, the DC motor driver 535 may not be provided with enough power to move the DC motor 35. The system may additionally be configured such that the valve may be moved to a safe (e.g. closed) position, as the supercapacitor may store enough power for a limited number of position changes.

In this way, the valve 30 is able to detect valve position no matter of power line status. In the event of there being no power, the supercapacitor secures the low voltage elements and puts logic signals on the connector pins. Therefore, the present valve with supercapacitor based backup power uses optical sensors instead of microswitches, yet can still indicate the position of the valve even if power to the valve is lost.

The inlet/outlet ports are controlled with vertical shaft, which varies the flow path depending on the vertical position of the shaft. By using such a vertical shaft, a comparatively simple position sensor may be utilised, by providing sight through-holes in the shaft such that diodes and corresponding sensors can be utilised for a simple, and low power position indication.

Additionally, the valve harvests supply power to charge the capacitor, and thereby, if there is a lack of power being supplied to the valve, the energy from the supercapacitor energy is used to power the limited voltage regulator. In such a case, even though the valve is not able to move the shaft, the system can still be informed of the position of the shaft, just as in a corresponding microswitch position sensor.

Such a valve therefore allows position indication independent of main power source, as well as a lower power consumption. There is provided a simple assembly design of sensor parts, with limited moving elements, and easier sealing. This results in a low assembly cost, with many possible configurations and a lower weight and various dimensions of valve being possible.

The provision of a shaft with integrated flow and sight through-holes allows for many different configuration of valves. Further, the sealed arrangement using cylindrical sealed threaded connectors allows for the sensors and electronics to be separated, thereby providing a more robust valve.

The invention claimed is:
1. A valve assembly comprising:
   a shaft, the shaft comprising;
      a sight through-hole; and a flow through-hole;
the valve assembly further comprising a shaft position mechanism, the shaft position mechanism comprising;
a driving means configured to provide movement to the shaft; and
at least one emitter and at least one corresponding sensor; and
the valve assembly further comprising at least one flow path from at least one fluid inlet to at least one fluid outlet;
wherein the shaft is configured to move across the at least one flow path so as to allow flow therethrough in a first position, and to block the at least one flow path in a second position;
wherein the at least one emitter and the at least one corresponding sensor are positioned such that, when the shaft is in the first position, the sensor can sense the emitter through the sight through-hole of the shaft, and when the shaft is in the second position, the sensor is blocked from the emitter by the shaft;
wherein:
the at least one emitter comprises a first and a second emitter, and the at least one corresponding sensor comprises corresponding first and second sensors, and wherein the at least one fluid outlet comprises a first and a second fluid outlet;
the shaft is further configured to move to a third position so as to allow flow from the at least one inlet to the first outlet, and block flow from the at least one inlet to the second outlet; and
the first and second emitter and the corresponding first and second sensors are positioned such that:
when the shaft is in the first position, the first sensor can sense the first emitter through the sight through-hole of the shaft, and the second sensor is blocked from the second emitter by the shaft;
when the shaft is in the second position, the first and second sensors are blocked from the first and second emitter by the shaft; and
when the shaft is in the third position, the second sensor can sense the second emitter through the sight through-hole of the shaft, and the first sensor is blocked from the first emitter by the shaft.

2. The valve assembly of claim 1, wherein the at least one fluid inlet and the at least one fluid outlet the fluid inlets and outlets are located within a bracket, and wherein the valve assembly is provided with a cylindrical cover with a threaded connection to connect to the bracket.

3. The valve assembly of claim 2, further comprising o-rings to seal the valve assembly.

4. The valve assembly of claim 1, wherein the at least one emitter are diodes.

5. The valve assembly of claim 1, further comprising power and signal wires for connection to an external system.

6. The valve assembly of claim 1, further comprising a direct current motor to operate the driving means.

7. The valve assembly of claim 1, wherein the shaft further comprises grooves configured to interact with the driving means to provide movement of the shaft.

8. The valve assembly of claim 1, further comprising:
a supercapacitor, the supercapacitor being configured to power the at least one emitter and the at least one sensor.

9. A system comprising;
the valve assembly of claim 8;
a control module; and
a power source, wherein the power source is configured to power the valve assembly and charge the supercapacitor, the supercapacitor being configured to power the at least one emitter and the at least one sensor in case of failure of the power source.

10. A system comprising:
a valve assembly comprising:
a shaft, the shaft comprising;
a sight through-hole; and
a flow through-hole;
a shaft position mechanism, the shaft position mechanism comprising;
a driving means configured to provide movement to the shaft; and
at least one emitter and at least one corresponding sensor; and
at least one flow path from at least one fluid inlet to at least one fluid outlet;
a supercapacitor, the supercapacitor being configured to power the at least one emitter and the at least one sensor;
wherein the shaft is configured to move across the at least one flow path so as to allow flow therethrough in a first position, and to block the at least one flow path in a second position;
wherein the at least one emitter and the at least one corresponding sensor are positioned such that, when the shaft is in the first position, the sensor can sense the emitter through the sight through-hole of the shaft, and when the shaft is in the second position, the sensor is blocked from the emitter by the shaft; and
a control module; and
a power source, wherein the power source is configured to power the valve assembly and charge the supercapacitor, the supercapacitor being configured to power the at least one emitter and the at least one sensor in case of failure of the power source;
wherein, in the event of a power failure of the power source, the shaft is configured to move to the second position, thereby closing the valve.

* * * * *